(12) United States Patent
Wu (10) Patent No.: US 8,355,179 B2
(45) Date of Patent: Jan. 15, 2013

(54) MULTI-TONAL COPY EVIDENT DOCUMENT METHODS AND PRODUCTS

(76) Inventor: Judy Wailing Wu, Markham (CA)

( * ) Notice: Subject to any disclaimer, the term of this patent is extended or adjusted under 35 U.S.C. 154(b) by 832 days.

(21) Appl. No.: 12/415,893

(22) Filed: Mar. 31, 2009

(65) Prior Publication Data

US 2009/0244641 A1 Oct. 1, 2009

Related U.S. Application Data

(60) Provisional application No. 61/041,153, filed on Mar. 31, 2008.

(51) Int. Cl.
*H04N 1/405* (2006.01)
*B41M 3/14* (2006.01)
*B42D 15/10* (2006.01)

(52) U.S. Cl. ............ 358/3.28; 358/3.06; 358/3.12; 283/93; 283/902

(58) Field of Classification Search .......... 358/3.06, 358/3.28, 3.09, 3.12, 1.14; 283/72, 93, 113, 283/901, 902
See application file for complete search history.

(56) References Cited

U.S. PATENT DOCUMENTS

| | | | | |
|---|---|---|---|---|
| 4,168,088 A * | 9/1979 | Somlyody | ............... | 283/93 |
| 4,210,346 A * | 7/1980 | Mowry et al. | ............... | 283/93 |
| 5,055,923 A * | 10/1991 | Kitagawa et al. | ............... | 358/534 |
| 5,946,103 A * | 8/1999 | Curry | ............... | 358/3.28 |
| 6,081,345 A * | 6/2000 | Curry | ............... | 358/3.28 |
| 6,092,732 A * | 7/2000 | Curry | ............... | 358/3.28 |
| 7,274,890 B2 * | 9/2007 | Uchida et al. | ............... | 283/902 |
| 7,307,761 B2 * | 12/2007 | Man | ............... | 358/3.28 |
| 7,738,143 B2 * | 6/2010 | Ishimoto et al. | ............... | 358/3.28 |
| 7,869,090 B2 * | 1/2011 | Wang et al. | ............... | 358/3.28 |
| 7,911,656 B2 * | 3/2011 | Washio | ............... | 358/3.14 |
| 8,132,508 B2 * | 3/2012 | Samworth et al. | ............... | 358/3.06 |
| 2011/0310404 A1 * | 12/2011 | Simske et al. | ............... | 358/3.28 |

* cited by examiner

*Primary Examiner* — Scott A Rogers
(74) *Attorney, Agent, or Firm* — Grossman, Tucker, Perreault & Pfleger, PLLC (57) ABSTRACT

The present disclosure relates to a printed multi-tonal document with enhanced copy evident distortions security features and a method of printing such document. The document may include a multi-tonal background screen image area including a first set of halftone elements and a multi-tonal foreground hidden warning text and/or graphic screen image area including a second set of halftone elements, wherein the first set of halftone elements may be smaller in size than the second set of halftone elements. The multi-tonal foreground hidden warning text and/or graphic image area, when electronically copied, may appear different from the background of the copy of the document.

15 Claims, 12 Drawing Sheets

MULTI-TONAL COPY EVIDENT DOCUMENT METHODS AND PRODUCTS

CROSS REFERENCE TO RELATED APPLICATIONS

The present application claims the benefit of the filing date of U.S. Provisional Application Ser. No. 61/041,153, filed Mar. 31, 2008, the teachings of which are incorporated herein by reference.

FIELD OF THE INVENTION

The present invention relates generally to duo-tone, tri-tone and/or up to full multi-tonal distortion security images for a printed document, which may be printed using common printing processes such as offset printing (lithography), letterpress, flexographic, intaglio and/or gravure techniques as well as using digital output devices/equipment such as laser printers or printer/copiers and/or ink-jet printers and/or commercial digital presses at any resolution. The resulting printed documents may include security features that may not be copied by color or black and white photocopiers.

BACKGROUND

The advent of improved photocopy equipment, mainly high-resolution color photocopy equipment, has presented a real challenge to thwart the unauthorized duplication of original documents. The quality of the reproductions is often so good that, it may be difficult to distinguish original copies from color reproductions. Many methods, products and security features have been developed to prevent the unauthorized reproduction of original valuable documents, such as currency, travelers checks, checks, RX prescription pads, coupons, gift certificates, licenses, passports, personal identification papers, as well as packaging material for brand protection to deter illegal activities such as counterfeiting. Generally these methods, products and security features may be formed by a pattern of dots, lines, screen structures or the like. Within the background pattern, additional information may be printed that is mostly hidden by the background pattern when viewed by a casual observer. The additional information may typically include a security warning such as the word "VOID" or "COPY". The security warning may become prominent on the copy such that even a casual observer will notice it. Thus, the original document may be easily distinguishable from its copied version by virtue of a warning such as "VOID" or "COPY" being prominently displayed on the copied version.

Many conventional approaches disclose various ways for providing methods and products that may enable copies of documents to be distinguished from the originals such as the use of a "large dot-small dot pattern" as described in such U.S. Pat. Nos. 4,227,720, 4,265,469, 4,310,180 and 4,341,404, the teachings of which are incorporated herein by reference, or a alternative version of the "large dot-small dot pattern" as to use bands of "large dot-small dot pattern" in varying dot sizes as described in such U.S. Pat. No. 5,340,159, the teachings of which are incorporated herein by reference, or "line screen pattern" as described in such U.S. Pat. Nos. 5,018,767, 5,193,853, 5,707,083, and 5,788,282, the teachings of which are incorporated herein by reference, in predetermined lines per inch spacing and line angles with the intention of producing distortion security screen. In such a manner, the latent images may be difficult to differentiate when being inspected with the unaided eye. However, hidden indicia may become apparent if the document is copied by color or black and white photocopiers. The principle method may include creating a disparity between the respective line screen values of the background pattern and the screen values of the hidden warning message that may allow the hidden warning message to appear on a reproduction of the original.

Also, many conventional approaches may incorporate a camouflaging pattern as described in U.S. Pat. No. 4,176,859, the teachings of which are incorporated herein by reference, to better disguise or suppress the visual appearance of the hidden warning message against its background pattern making it even more difficult to differentiate when being inspected with the unaided eye. However, the adverse effect of such a camouflaging pattern layer is that it may decrease the effectiveness of the security screen, masking or eliminating much of the security screen causing many geometric patterns not to be conducive for use to create and produce a highly distortion security images.

Other conventional approaches as described in U.S. Pat. No. 6,396,927, the teachings of which are incorporated herein by reference, may use a camouflaging layer, which may comprises a camouflage pattern that may be printed in thermochromic ink, which may vary with temperature. The camouflaging layer may be inactivate at room temperatures so that the latent message may be suppressed on the original document, and activated at scanning temperatures so that the latent message may be exhibited on a reproduction of the original document. The effectiveness of the thermochromic inks may be highly dependent of the condition and/or age of the documents, as well as the scanning temperatures of the copiers.

Therefore, what may be needed is a copy evident document protection method and apparatus that enables a simple and expedient way to incorporate improved distortion security images into a duo-tone, tri-tone and/or up to full multi-tonal printed documents, that may more effectively conceal the visual appearance of the hidden warning message on the original document using any camouflaging pattern without limitation or restriction, and at the same time, increase the effectiveness of the effect of the hidden message on a reproduction of the original document.

Moreover, what may be needed are methods for producing such duo-tone, tri-tone, and/or up to full multi-tonal original documents having such improved distortion security features calibrated, modified, transformed and/or customized for each printing process such as offset printing (lithography), letterpress, flexographic, intaglio and/or gravure techniques as well as for digital output equipment such as laser printers or printer/copiers and/or ink-jet printers and/or digital presses at any resolution.

Additionally, what may also be needed is a document protection method and apparatus that may enable a simple and expedient way to incorporate improved distortion duo-tone, tri-tone and/or up to full multi-tonal security features, that may vary from document to document, printed on demand, printed at any resolution, printed using laser printers (including laser copier/printer) and/or ink-jet printers and/or DI (direct image) presses and/or sheet/web, ink/toner based digital presses such as but not limited to presses from HP, Kodak, Xerox, Oce, Xeikon, etc., to prevent the unauthorized reproduction of original valuable documents through the use of photocopiers.

SUMMARY

An aspect of the present disclosure relates to a printed multi-tonal document with enhanced copy evident distortions security features. The document may include a multi-tonal background screen image area including a first set of halftone elements and a multi-tonal foreground hidden warning text and/or graphic screen image area including a second set of halftone elements, wherein the first set of halftone elements may be smaller in size than the second set of halftone elements. The multi-tonal foreground hidden warning text and/or graphic image area, when electronically copied, may appear different from the background of the copy of the document.

Another aspect of the present disclosure relates to a method of printing a multi-tonal document with enhanced copy evident distortions security features. The method may include converting an electronic source graphic file into a converted electronic digital security file including a multi-tonal background screen image area including a first set of halftone elements and a multi-tonal foreground hidden warning text and/or graphic screen image area including a second set of halftone elements, wherein the first set of halftone elements are smaller in size than the second set of halftone elements. The method may also include printing the converted electronic digital security file creating a printed document with the multi-tonal background and the multi-tonal foreground. When the printed document is electronically copied, creating a copy of said printed document, the foreground areas may appear differently from the background area on the copy of the printed document.

A further aspect of the present disclosure may include an article comprising a storage medium having stored thereon instruction that when executed by a machine may result in the operation of converting an electronic source graphic file into a converted electronic digital security file. The converted electronic digital security file may include a multi-tonal background screen image area including a first set of halftone elements and a multi-tonal foreground hidden warning text and/or graphic screen image area including a second set of halftone elements, wherein the first set of halftone elements are smaller in size than the second set of halftone elements. In addition, the instruction may result in the operation of printing the converted electronic digital security file creating a printed document with the multi-tonal background and the multi-tonal foreground, wherein when the printed document is electronically copied creating a copy of the printed document, the foreground areas appear differently from the background area on the copy of the printed document.

BRIEF DESCRIPTION OF THE DRAWINGS

The above-mentioned and other features and advantages of this invention, and the manner of attaining them, will become appreciated and be more readily understood by reference to the following detailed description of one embodiment of the invention in conjunction with the accompanying drawings, wherein:

FIG. 13 shows a close-up of 28 in FIG. 11, wherein a "large dot-small dot pattern" is deployed to create the distortion security screen. The background image area 29 in the original document uses a "small dot pattern" and the foreground hidden warning text and/or graphic "VOID" image area 30 in the original document uses a "large dot pattern," wherein 29 and 30 combine to produce a first tone. The background image area 31 in the original document uses a "small dot pattern" and the foreground hidden warning text and/or "VOID" image area 32 in the original document uses a "large dot pattern", wherein 31 and 32 combine to produce a second tone that is used to create the mask of the camouflaging pattern. In this example, the camouflaging pattern is illustrated as the second tone. As one can see, the camouflaging pattern is another distortion security screen in one tone over the first background distortion security screen of another tone to produce a continuation of a distortion security screen over the entire duo-tone document.

FIG. 14 shows a close-up of 28 in FIG. 11, where a "dash line screen pattern" in predetermined (or given) lines per inch spacing and line angles is deployed to create the distortion security screen. The background image area 33 in the original document uses a "dash line screen pattern" in a predetermined (or given) lines per inch spacing and line angles and the foreground hidden warning text and/or graphic "VOID" image area 34 in the original document uses a "line screen pattern" in another predetermined (or given) lines per inch spacing and/or line angles, wherein 33 and 34 combine to produce a first tone. The background image area 35 in the original document uses a "dash line screen pattern" in a predetermined (or given) lines per inch spacing and line angles and the hidden warning message "VOID" image area 36 in the original document uses a "line screen pattern" in another predetermine lines per inch spacing and line angles where 35 and 36 combine to produce a second tone that may be used to create the mask of the camouflaging pattern. In this example, the camouflaging pattern is illustrated as the second tone.

FIG. 20 shows a close-up of the printed electronic security file comprising of multiple halftone screens, in this example using, a "large dot-small dot pattern", where 41 represents the background image area in the printed document where the "small dot pattern" was used to rasterize the background area of the source image, 42 represents the foreground hidden warning text and/or graphic "VOID" image area in the printed document, where the "large dot pattern" was used to rasterized the foreground hidden warning text and/or graphic area of the source image, when the 2 screens are combined and properly calibrated to each one another, such that printed electronic security file using a specified designated workflow and printing device/equipment/press will render an copy evident original document with a distortion security image.

DETAILED DESCRIPTION

The present disclosure contemplates duo-tone, tri-tone and/or up to full multi-tonal original documents which may by printed using printing processes such as offset printing (lithography), letterpress, flexographic, intaglio and/or gravure as well as by digital output equipment such as laser printers or printer/copiers and/or ink-jet printers and/or sheet/web, ink/toner based digital presses such as but not limited to presses from HP, Kodak, Xerox, Oce, Xeikon, etc., at any resolution with relatively improved distortion copy evident security features effective against color and/or black and white photocopiers to prevent unauthorized duplication and/or reproduction of original documents.

The present invention relates to a method and product for printing multi-tonal copy evident documents, where a distortion in copy evident security screen may be assigned to one unit on a press if using common print processes. A distortion copy evident security screen in the form of a converted electronic digital security file may be created, so when printed represents tones from 8% density to 50% density, including all values and increments therein, contained in a multi-tonal document. Tone may be defined as a shade created by one color ink and may be related to the direct proportion to the number and size of the halftone elements used in the screen. In such a case shades may range from 0%, which represents "white" or 0% ink coverage and 100% exposed paper with no halftone elements in the screen, all the way to 100%, which represents a solid pattern or total coverage of 100% ink and 0% exposed paper, 50% would represent coverage of 50% ink and 50% exposed paper and so on.

Each desired tone in the document may be treated as a single layer and an independent distortion copy evident security screen may be created. The final screen may be the merging of all layers into one single distortion copy evident screen in the form of a converted electronic digital security file used to create the final duo-tone, tri-tone and/or up to a full multi-tonal document.

Figure 1:
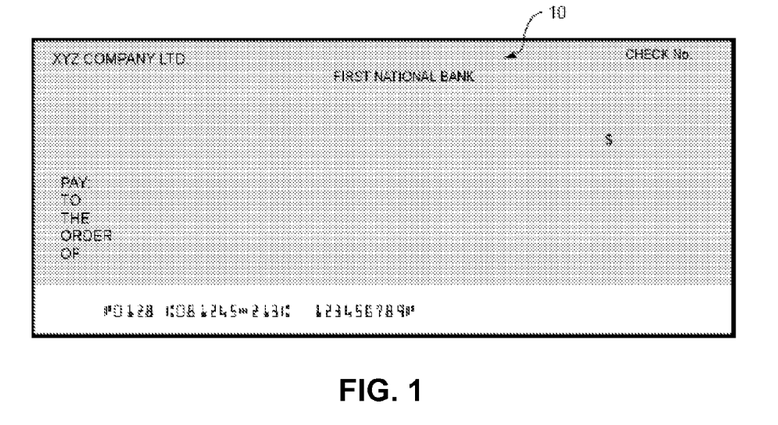
FIG. 1 shows an embodiment, an original document in the form of a check, incorporating the distortion security screen 10 wherein the background image and hidden warning message image are presented as a uniform tone to the eye.
Figure 2:
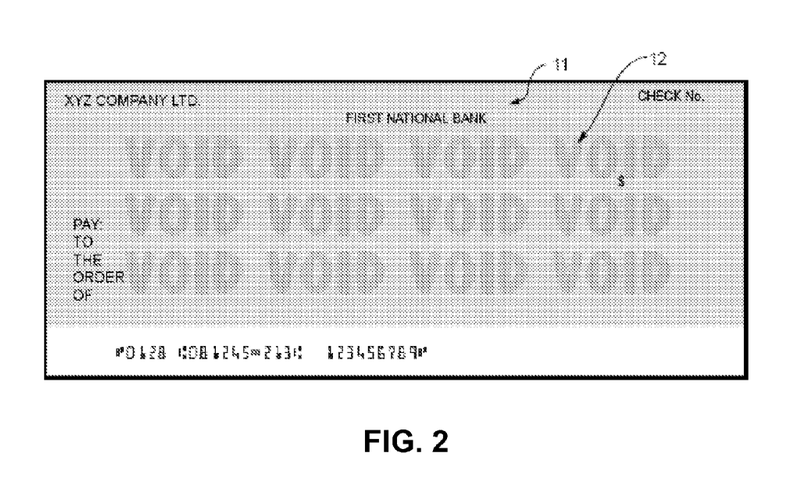
FIG. 2 illustrates the document of FIG. 1 after having been copied by a photocopying machine, 11 represents the background image area in the original document and 12 represents the foreground hidden warning hidden text and/or graphic "VOID" image area.
Figure 3:
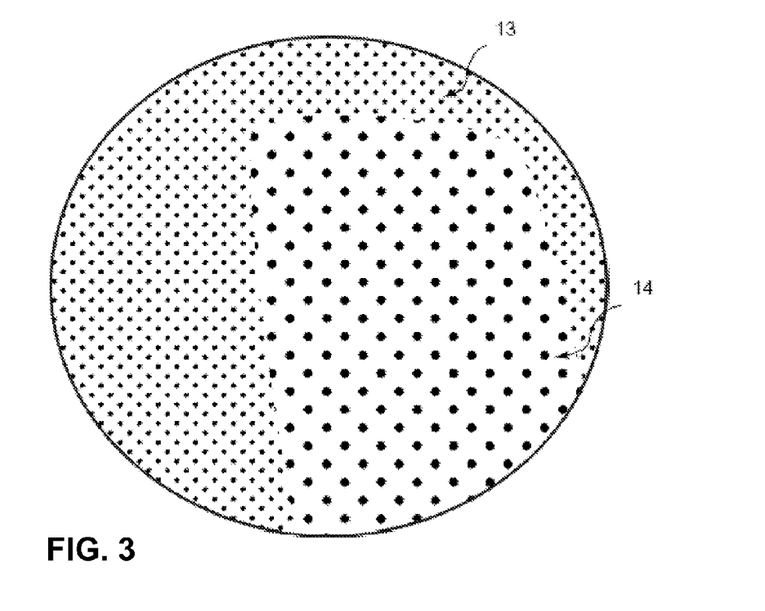
FIG. 3 is an example of a conventional example in the field of this invention, which uses a "large dot-small dot pattern" as described in U.S. Pat. Nos. 4,227,720, 4,265,469, 4,310,180 and 4,341,404. The background image area in the original document 13 uses a "small dot pattern" and the foreground hidden warning hidden text and/or graphic "VOID" image area 14 in the original document uses a "large dot pattern".
Figure 4:
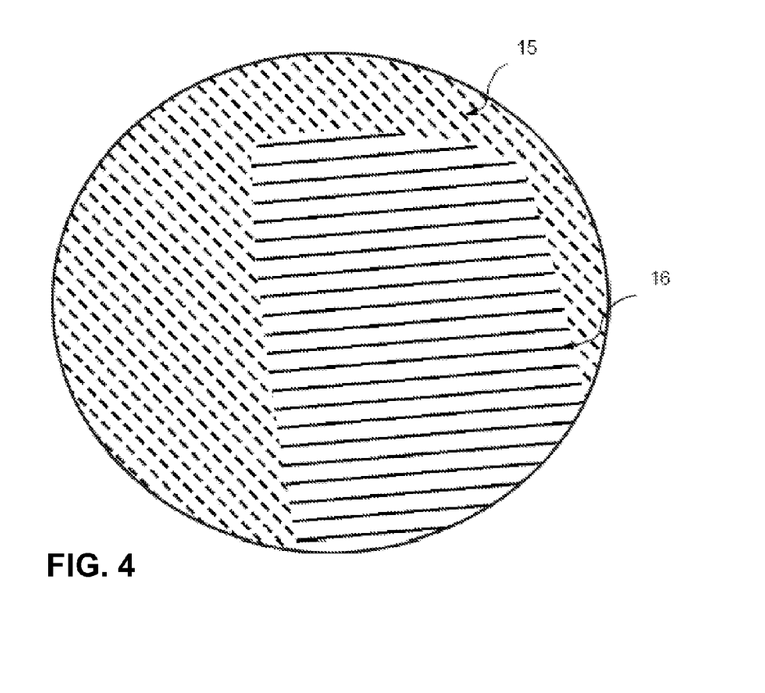
FIG. 4 is an example of another conventional example in the field of this invention such as the use of a "line screen pattern". The background image area in the original document 15 uses a "dash line screen pattern" as described in U.S. Pat. No. 5,788,285 in predetermined (or given) lines per inch spacing and line angles and the foreground hidden warning text and/or graphic "VOID" image area 16 in the original document uses a "solid line screen pattern" in another predetermined (or given) lines per inch spacing and line angles.
Figure 5:
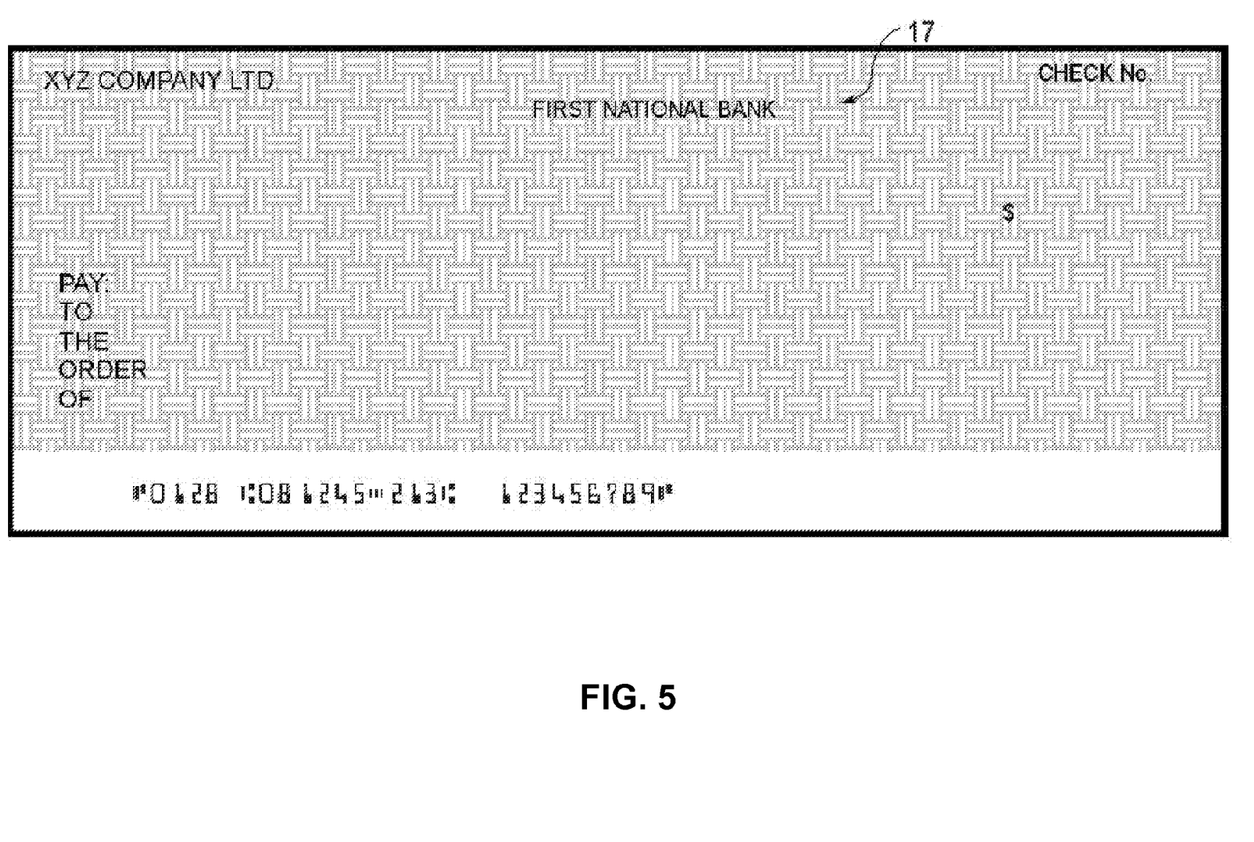
FIG. 5 shows another conventional example, an original document in the form of a check, incorporating the distortion security screen 17 wherein the background image and foreground hidden warning text and/or graphic image are presented incorporating the use of a camouflaging pattern described in such U.S. Pat. No. 4,176,859, to better disguise or suppress the visual appearance of the hidden warning message against its background pattern making it even more difficult to differentiate when being inspected with the unaided eye. In this example, the camouflaging pattern is illustrated as "white" which is the standard method of applying a camouflaging pattern to distortion security screen; however, the camouflaging pattern may also be printed as a second layer using another color.
Figures 6, 7, 8:
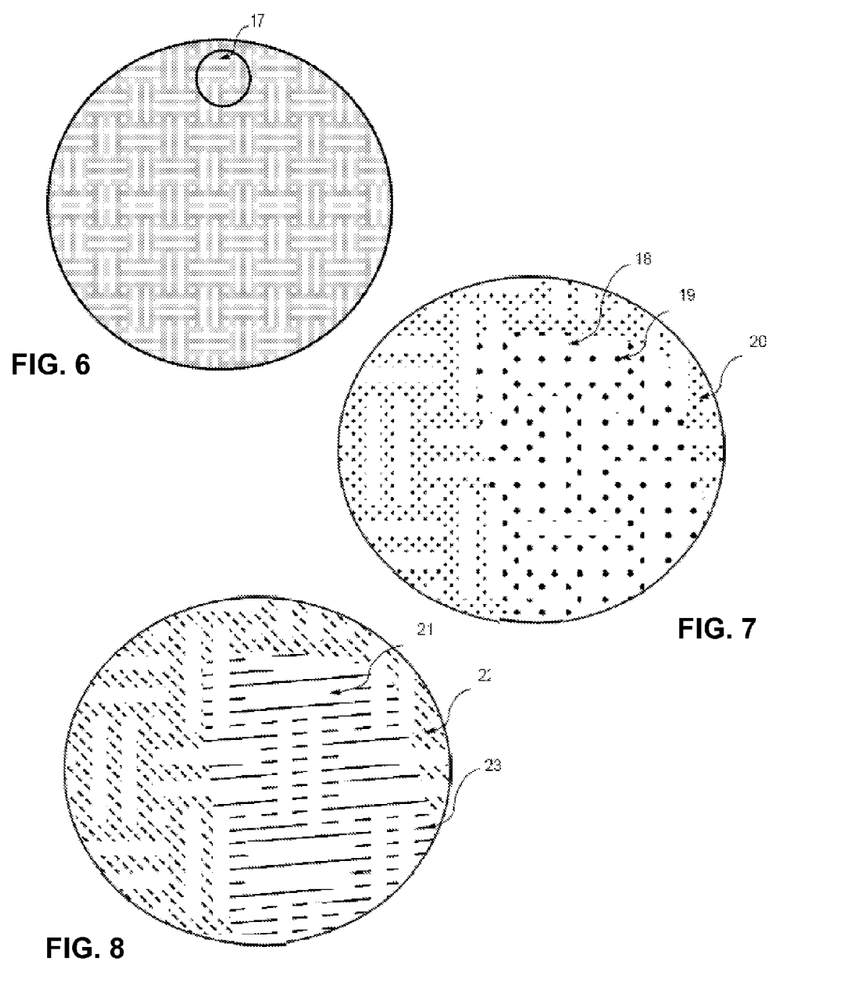
FIG. 6 a close-up of FIG. 5, wherein 17 represents an area where the distortion security screen that is masked with a camouflaging pattern.
FIG. 7 shows a close-up of 17 in FIG. 6, using a conventional example in the field of this invention such as the use of a "large dot-small dot pattern". The background image area 20 in the original document uses a "small dot pattern", and the foreground hidden warning text and/or graphic "VOID" image area 19 in the original document uses a "large dot pattern" and 18 represents the mask of the camouflaging pattern. In this example, the camouflaging pattern is illustrated as "white". The camouflaging pattern may mask the distortion security screen making it less effective against unauthorized duplication of original document on photocopiers.
FIG. 8 shows a close-up of FIG. 6, using another conventional example in the field of this invention such as the use of a "line screen pattern". The background image area 22 in the original document uses a "dash line screen pattern" in a predetermined (or given) lines per inch spacing and/or line angles and the foreground hidden warning text and/or graphic "VOID" image area 23 in the original document uses a "line screen pattern" in another predetermined (or given) lines per inch spacing and line angles and 21 represents the mask of the camouflaging pattern. In this example, the camouflaging pattern is illustrated as "white".
Figure 9:
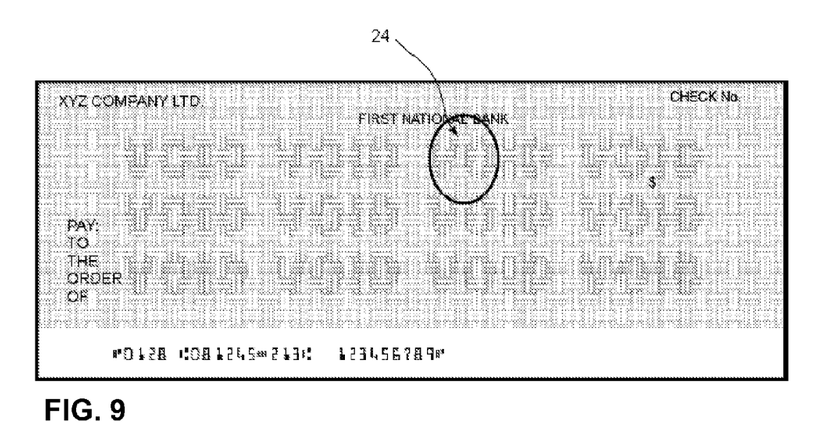
FIG. 9 illustrates the document of FIG. 5 after having been copied by a photocopying machine, 24 represents a region of the background image area in the original document and the foreground hidden warning text and/or graphic "VOID" image area.
Figure 10:
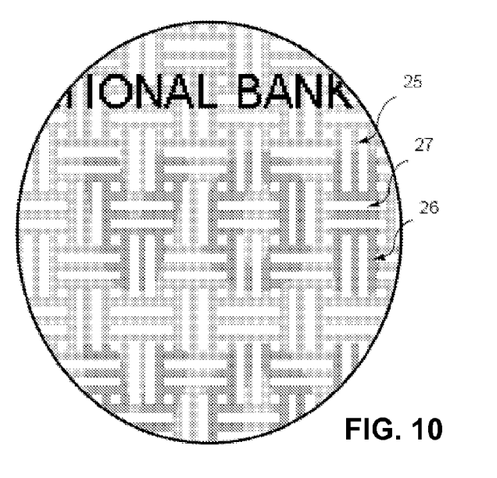
FIG. 10 illustrates a close-up of 24 in FIG. 9 after having been copied by a photocopying machine, wherein 25 represents a region of the background image area in the original document, 26 represents a region of the foreground hidden warning text and/or graphic "VOID" image area and 27 represents the camouflaging pattern where in this example the camouflaging pattern is illustrated as "white". As one can see, the camouflaging pattern is a non-reactive area and may not render any effect on copiers.
Figure 11:
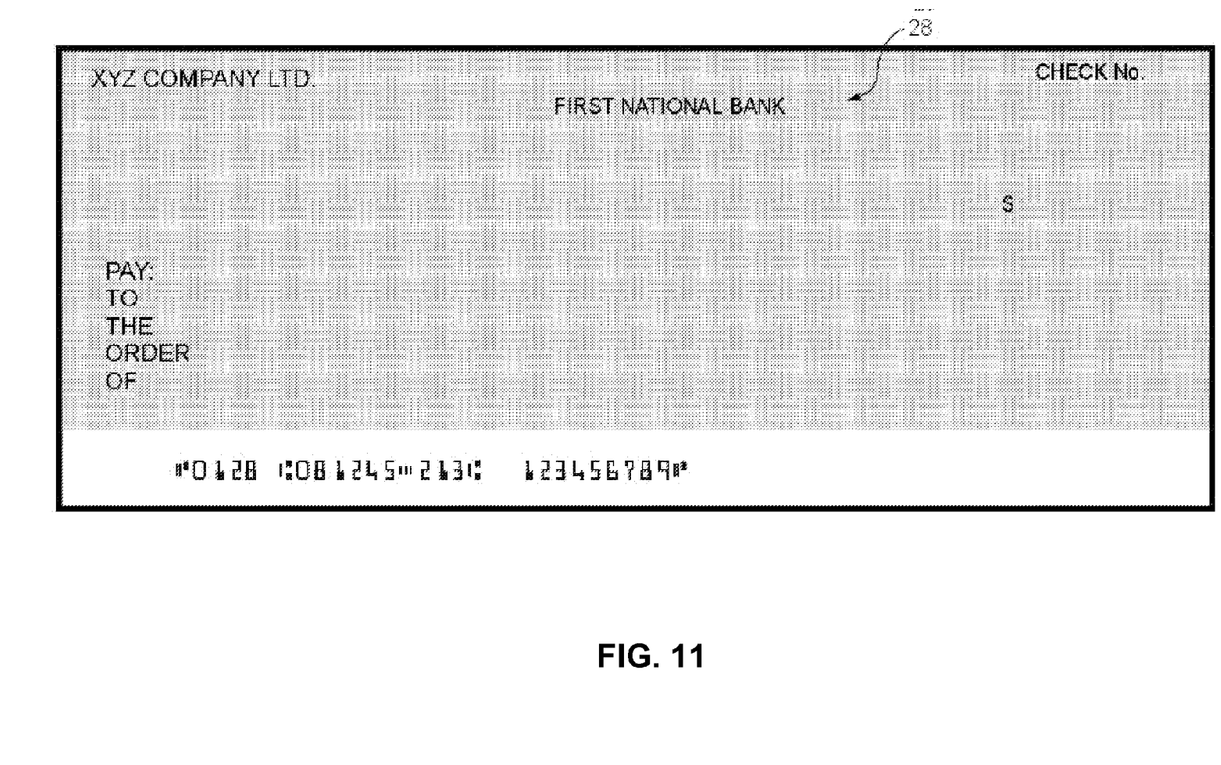
FIG. 11 is an example of the invention contemplated herein; wherein an original document in the form of a check, incorporates a duo-tone distortion security screen 28 when the background image and hidden warning message image are presented as a duotone image to the eye.
Figures 12, 13, 14:
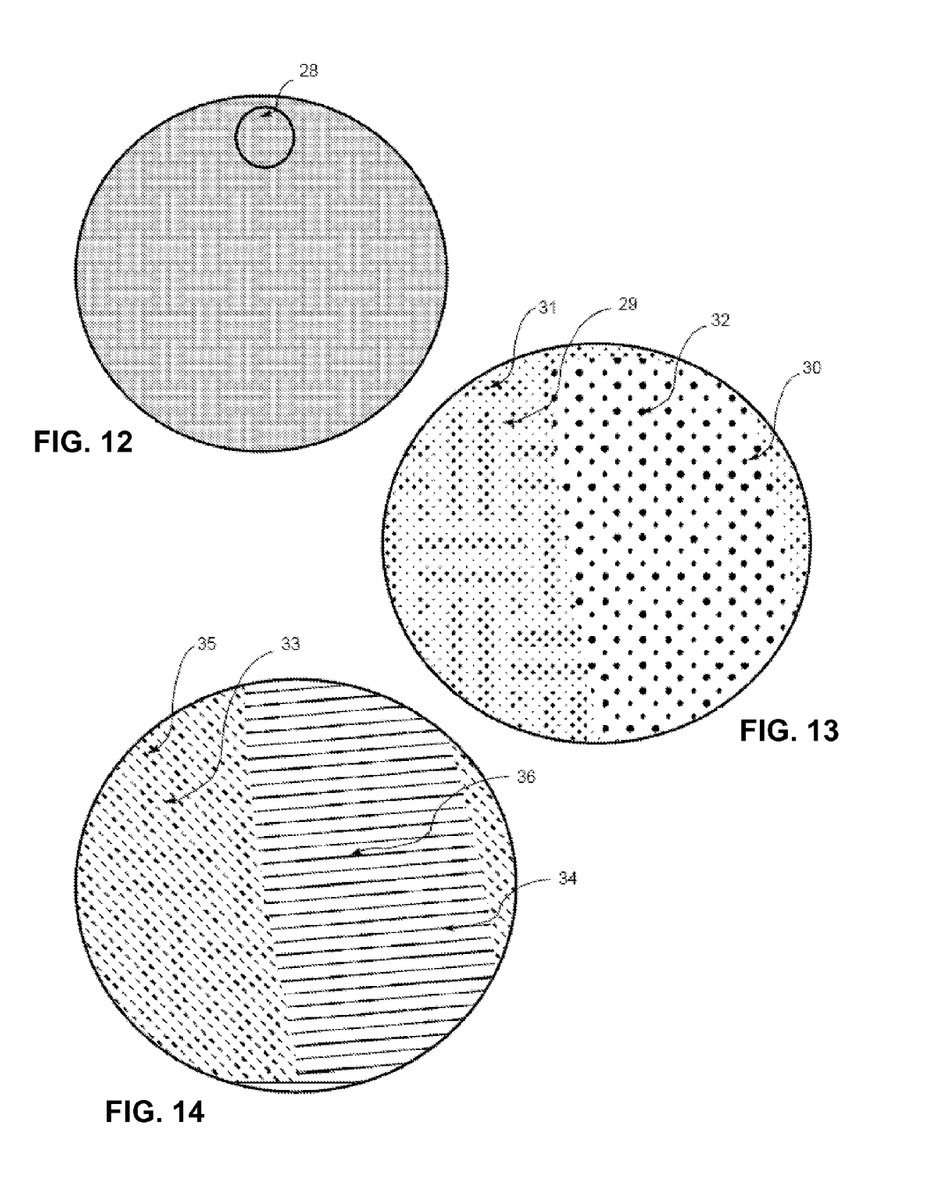
FIG. 12 is a close-up of FIG. 11, wherein 28 represents an area where the distortion security screen is created in one tone and then masked with a camouflaging pattern of a second tone, creating a duo-tone document.
Figure 15:
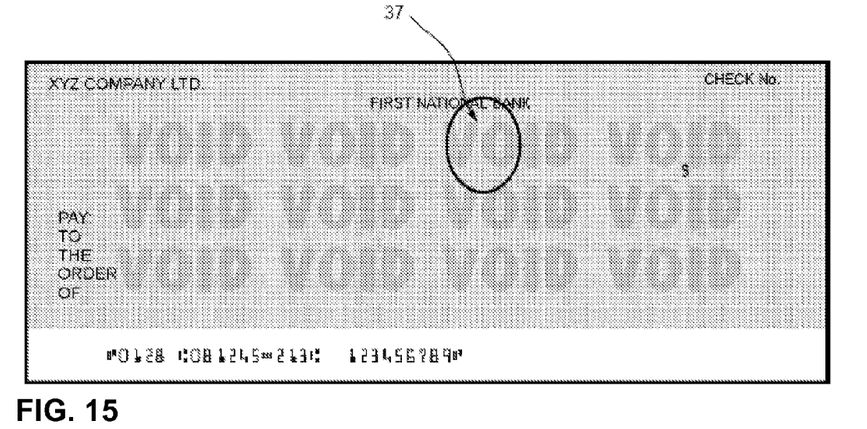
FIG. 15 illustrates the document of FIG. 11 after having been copied by a photocopying machine, wherein 37 represents a region of the background image area in the original document and the hidden warning message "VOID" image area.
Figure 16:
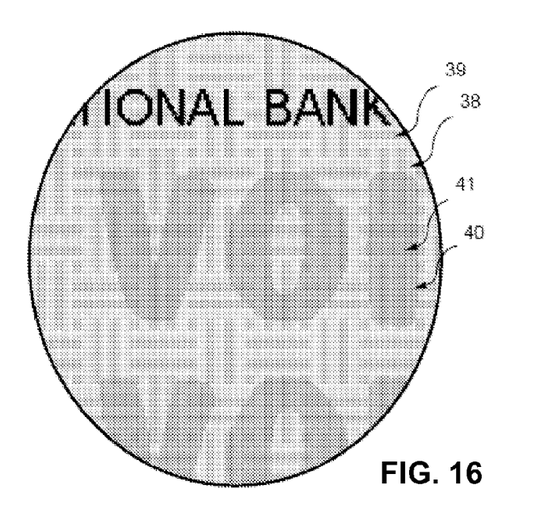
FIG. 16 illustrates a close-up of 37 in FIG. 11 after having been copied by a photocopying machine, wherein 38 represents a region in the first tone and 39 represents a region in the second tone, as the camouflaging pattern, both belonging to the background image area of the original document. In addition, a region in the first tone 40 and a second tone 41, as the camouflaging pattern, both belonging to of the hidden warning message "VOID" image area of the original document. This distortion security screen is a continuous distortion screen and it is reflected in the photocopy of the original document in which the camouflaging pattern will render the same effect on copiers as the non camouflaging region of the document.
Figure 17:
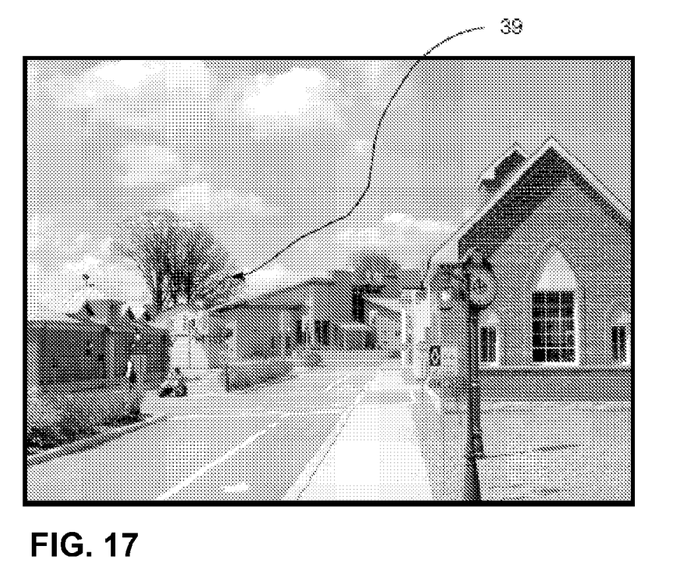
FIG. 17 illustrates another embodiment of the present invention; wherein an original document is provided in the form of a multi-tonal image, incorporating a multi-tonal distortion security screen 41 when the background image and foreground hidden warning text and/or graphic image are presented as a multi-tonal image to the eye.
Figure 18:
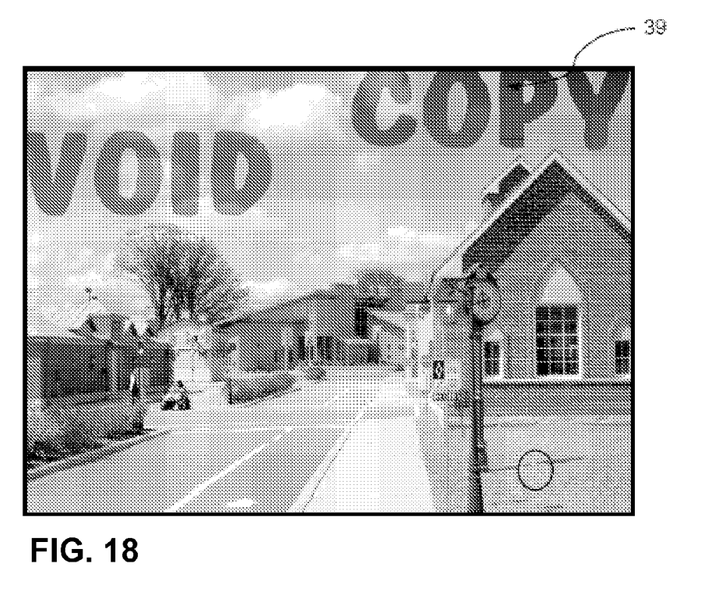
FIG. 18 illustrates the document of FIG. 17 after having been copied by a photocopying machine, 39 represents a region of the background image area in the original document and the foreground hidden warning text and/or graphic as in the example "VOID COPY" image area.
Figure 19:
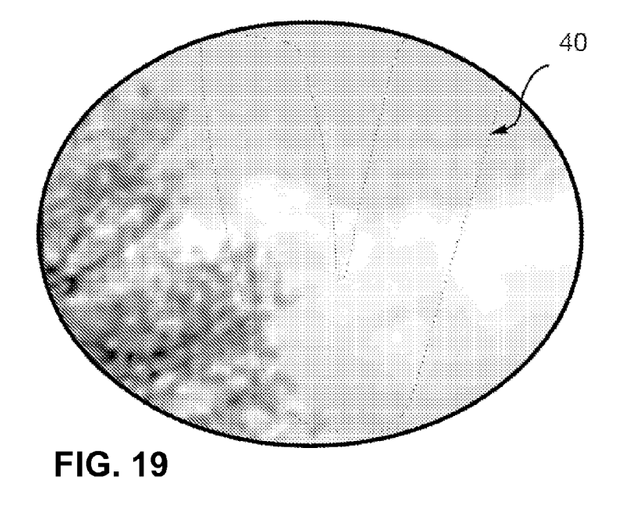
FIG. 19 shows a close-up of FIG. 17 representing a continuous multi-tonal source image, 40 represents the area of the foreground hidden warning text and/or graphic "VOID" image prior to the graphic being converted to an electronic security file comprise of multiple halftone screens.
Figure 20:
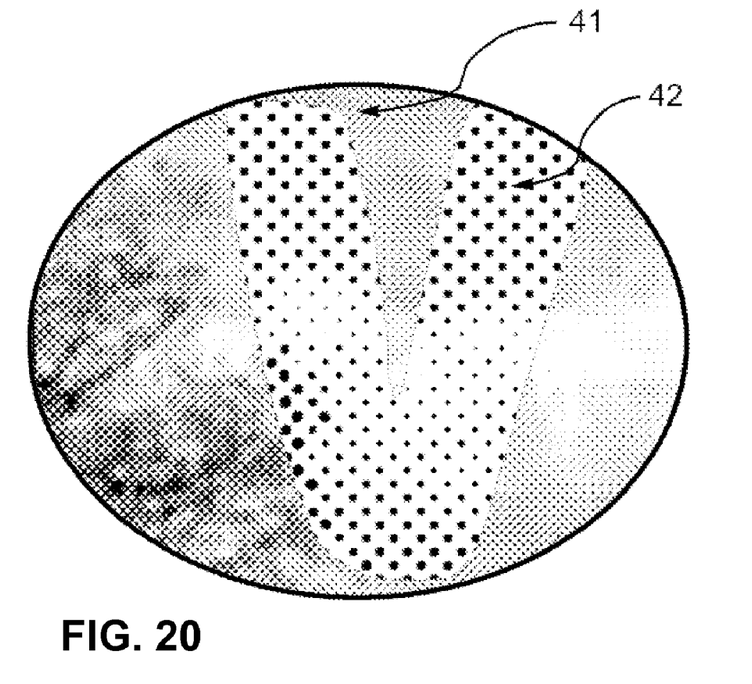

One example of the present invention is illustrated in FIG. 11, illustrating an original printed document in the form of a check, wherein a camouflaging pattern printed in a "darker" tone, in this example, roughly as an example, 16% ink coverage, is different from the printed background "lighter" tone, in this example roughly 10% ink coverage. Regardless as to what methods used to create the copy evident security screen, such as but not limited to, the use of a "large dot small dot pattern" or the use of "line screen pattern" in a predetermined (or given) lines per inch spacing and line angles and/or combination of these methods, the present inventive method relates to the creation of multiple distortion copy evident security screens for each tone contained in the document where the distortion copy evident security screen may be a continuous distortion copy evident screen through out the entire document.

In a press printed document, this continuous distortion copy evident screen in the form of a converted electronic digital security file may be output to a film or plate image setter onto one plate ready for use in printing processes such as offset printing (lithography), letterpress, flexographic, intaglio and/or gravure to produce a press printed multi-tonal document without the use of other plates on the press. The use of more than one ink on the print unit, defined as prismatic printing, where a multiple of colors would be the final result in a press printed document even when only one unit is assigned in the press printing process.

In a digitally printed document, this distortion copy evident screen in the form of a converted electronic digital security file may be assigned to be output using one cartridge on the laser printers or printer/copiers and/or inkjet printers and/or commercial digital presses printed multi-tonal document.

A RIP (raster image processor) is not used to process the converted electronic digital security file generated by a computer application to output a desired image on a digital output device such as an image setter, standard press processes such as but not limiting to offset printing (lithography), letterpress, flexographic, and gravure, as well as most digital printers/copiers, digital presses and DI (direct image) presses. The ripping process may convert digital information such as a PostScript file into a raster image. That is, the RIP may take the digital information about fonts and graphics that describes the appearance of the electronic file and translate it into an image composed of individual halftone element that the imaging device (such as the printer or image setter) can output.

In order to bypass conversion issues between tonal distortion copy evident image with the RIP, the present invention may rely on the production of a bitmap image calibrated to the output device to ensure a nearly exact or exact conversion of the electronic merged duo-tone, tri-tone and/or up to a full multi-tonal distortion copy evident bitmap through the output device used in the specified print process.

Accordingly, an example of a printed multi-tonal document with enhanced copy evident distortions security features may include a multi-tonal background screen image area including a first set of halftone elements and a multi-tonal foreground hidden warning text and/or graphic screen image area including a second set of halftone elements, wherein the first set of halftone elements are smaller in size than the second set of halftone elements. The multi-tonal foreground hidden warning text and/or graphic image area when electronically copied may appear different from the background of the copy of the document. It may be appreciated that the foreground areas and the background areas of the printed document may, otherwise, be difficult to differentiate with the unaided eye. In some examples, at least a portion of said multi-tonal background screen image area is adjacent to at least a portion of said multi-tonal foreground hidden warning text and/or graphic screen image area.

The first set of halftone elements may be selected from the group consisting of dots of any shapes, straight lines, broken lines, continuous wavy lines, non-continuous wavy lines and combinations thereof arranged in a fixed line frequency ranging from 100 to 400 line per inch (lpi), at any line angle. It may be appreciated that the first set of halftone elements may vary in size or line width, depending on the desired printed tone density. In addition, in some examples, the first set of halftone elements may include dots of varied shapes arranged in a random pattern and having a size ranging from 10 microns to 100 microns. In other examples, the first set of halftone elements may include dots of a given shape arranged in a random pattern and vary in size, wherein said size ranges from 10 microns to 100 microns. The halftone element shape, pattern, frequency, angle and/or size may be selected based on the desired halftone density or printed tone density.

The second set of halftone elements may be selected from the group consisting of dots of any shapes, straight lines, broken lines, continuous wavy lines, non-continuous wavy lines and combinations thereof arranged in a fixed line frequency ranging from 30 to 100 line per inch (lpi) at any line angle. It may be appreciated that the second set of the halftone elements may vary in size or line width, depending on the desired printed tone density. In some examples, the second set of halftone elements may include dots of varied shapes arranged in a random pattern and having a size ranging from 50 to 200 microns. Furthermore, in other examples, the second set of halftone elements may include dots of a given shape arranged in a random pattern and vary in size, wherein the size ranges from 50 to 200 microns. Again, the halftone element shape, pattern, frequency, angle and/or size may be selected based on the desired halftone density or printed tone density.

In another aspect, the present disclosure relates to a method of printing a multi-tonal document with enhanced copy evident distortions security features. The method may include converting an electronic source graphic file into a converted electronic digital security file including a multi-tonal background screen image area including a first set of halftone elements and a multi-tonal foreground hidden warning text and/or graphic screen image area including a second set of halftone elements, wherein the first set of halftone elements are smaller in size than the second set of halftone elements. The method may also include printing the converted electronic digital security file creating a printed document with the multi-tonal background and the multi-tonal foreground. It may be appreciated that the foreground areas and the background areas may be difficult to differentiate with the unaided eye. However, when the printed document is electronically copied creating a copy of the printed document, the foreground areas may appear differently from the background area on the copy of the printed document.

The method may also include printing the converted electronic digital security file on an output device and setting the resolution of said converted electronic digital security file at a resolution that is a fraction of the output resolution of the output device; although, it may be appreciated that the resolution may be set to be the same as the resolution of the output device. In addition, the converted electronic digital security file may be printed using a printing device selected from the group consisting of film image setters, computer to plate setters to generate file or plate, offset printers, letterpress printer, flexographic printer, intaglio printer, gravure printer, commercial digital presses, ink jet digital printers, toner based digital printers and multifunction printers.

Figure 21:
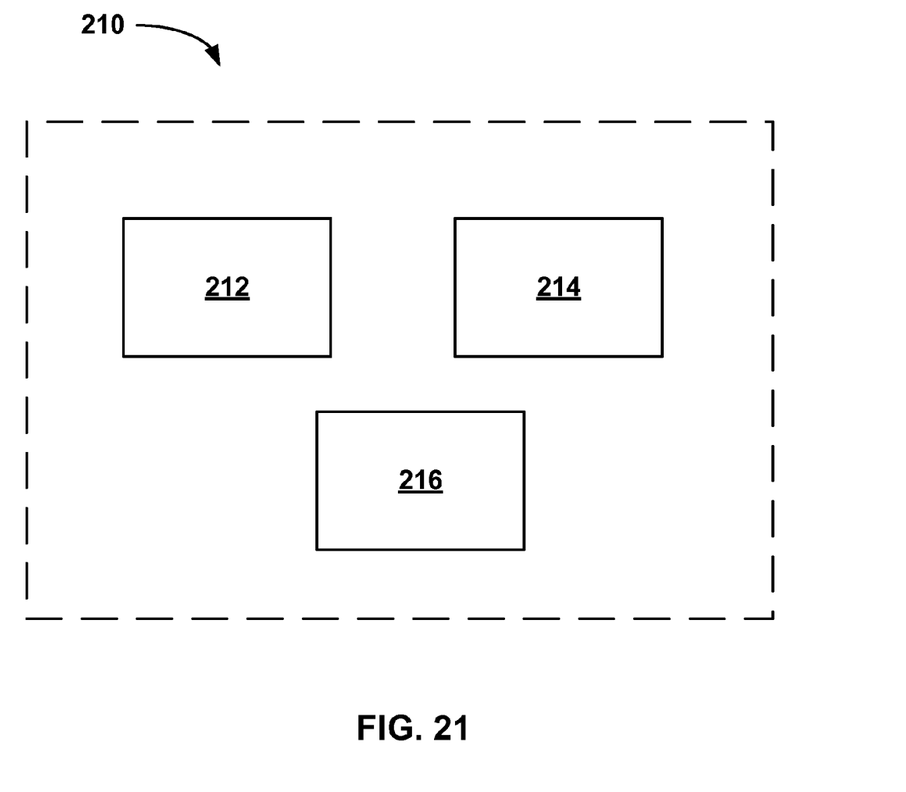
FIG. 21 illustrates an example relating to an article of machine readable media in relation to a processor and a user interface.

It may also be appreciated that the functionality described herein for the embodiments of the present invention may be implemented by using hardware, software, or a combination of hardware and software, either within a computer, printer or other printing device, as desired. If implemented by software, a processor and a machine readable medium may be required. The processor may be of any type of processor capable of providing the speed and functionality required by the embodiments of the invention. Machine-readable memory includes any media capable of storing instructions adapted to be executed by a processor. Some examples of such memory may include, but are not limited to, read-only memory (ROM), random-access memory (RAM), programmable ROM (PROM), erasable programmable ROM (EPROM), electronically erasable programmable ROM (EEPROM), dynamic RAM (DRAM), magnetic disk (e.g., floppy disk and hard drive), optical disk (e.g. CD-ROM), and any other device that can store digital information. The instructions may be stored on medium in either a compressed and/or encrypted format. Accordingly, in the broad context of the present invention, and with attention to FIG. 21, the computer, printer or other printing device 210, as desired, may contain a processor 212 and machine readable media 214 and user interface 216.

It may be appreciated that some examples, an article comprising a storage medium having stored thereon instruction that when executed by a machine may result in the operation of converting an electronic source graphic file into a converted electronic digital security file. The converted electronic digital security file may include a multi-tonal background screen image area including a first set of halftone elements and a multi-tonal foreground hidden warning text and/or graphic screen image area including a second set of halftone elements, wherein the first set of halftone elements are smaller in size than the second set of halftone elements. In addition, the instruction may result in the operation of printing the converted electronic digital security file creating a printed document with the multi-tonal background and the multi-tonal foreground, wherein when the printed document is electronically copied creating a copy of the printed document, the foreground areas appear differently from the background area on the copy of the printed document.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A printed multi-tonal document with enhanced copy evident distortions security features comprising:
   a multi-tonal background screen image area including a first set of various size halftone elements and a multi-tonal foreground hidden warning text and/or graphic screen image area including a second set of various size halftone elements, wherein said first set of various size halftone elements are smaller in size than said second set of various size halftone elements, wherein said multi-tonal foreground hidden warning text and/or graphic image area when electronically copied appear different from the background of the copy of said document and wherein each tone of multiple tones produced by a single said background screen and a single said foreground screen are a shade created by one ink color.

2. The printed multi-tonal document in claim 1, wherein at least a portion of said multi-tonal background screen image area is adjacent to at least a portion of said multi-tonal foreground hidden warning text and/or graphic screen image area.

3. The printed multi-tonal document in claim 1, wherein said first set of various size halftone elements are selected from the group consisting of dots of any shapes, straight lines, broken lines, continuous wavy lines, non-continuous wavy lines and combinations thereof arranged in a fixed line frequency ranging from 100 to 400 line per inch (lpi), at any line angle.

4. The printed multi-tonal document in claim 1, wherein said first set of various size halftone elements includes dots of varied shapes arranged in a random pattern and having a size ranging from 10 microns to 100 microns.

5. The printed multi-tonal document in claim 1, wherein said second set of various size halftone elements are selected from the group consisting of dots of any shapes, straight lines, broken lines, continuous wavy lines, non-continuous wavy lines and combinations thereof arranged in a fixed line frequency ranging from 30 to 100 line per inch (lpi) at any line angle.

6. The printed multi-tonal document in claim 1, wherein said second set of various size halftone elements includes dots of varied shapes arranged in a random pattern and having a size ranging from 50 to 200 microns.

7. A method of printing a multi-tonal document with enhanced copy evident distortions security features, the method comprising:
   converting an electronic source graphic file into a converted electronic digital security file including a multi-tonal background screen image area including a first set of various size halftone elements and a multi-tonal foreground hidden warning text and/or graphic screen image area including a second set of various size halftone elements, wherein said first set of various size halftone elements are smaller in size than said second set of various size halftone elements; and
   printing the converted electronic digital security file creating a printed document with said multi-tonal background and said multi-tonal foreground, wherein when said printed document is electronically copied creating a copy of said printed document, said foreground areas appear differently from the background area on said copy of said printed document and wherein each tone of multiple tones produced by a single said background screen and a single said foreground screen are a shade created by one ink color.

8. The method of claim 7, wherein said first set of various size halftone elements are selected from the group consisting of dots of any shapes, straight lines, broken lines, continuous wavy lines, non-continuous wavy lines and combinations thereof arranged in a fixed line frequency ranging from 100 to 400 line per inch (lpi), at any line angle.

9. The method of claim 7, wherein said first set of various size halftone elements includes dots of varied shapes arranged in a random pattern and having a size ranging from 10 microns to 100 microns.

10. The method of claim 7, wherein said second set of various size halftone elements are selected from the group consisting of dots of any shapes, straight lines, broken lines, continuous wavy lines, non-continuous wavy lines and combinations thereof arranged in a fixed line frequency ranging from 30 to 100 line per inch (lpi) at any line angle.

11. The method of claim 7, wherein said second set of various size halftone elements includes dots of varied shapes arranged in a random pattern and having a size ranging from 50 to 200 microns.

12. The method of claim 7, further comprising printing the converted electronic digital security file on an output device and setting the resolution of said converted electronic digital electronic security file at a resolution that is a fraction of the output resolution of the output device.

13. The method of claim 7, wherein said converted electronic digital security file is printed using a printing device selected from the group consisting of film image setters, computer to plate setters to generate file or plate, offset printers, letterpress printer, flexographic printer, intaglio printer, gravure printer, commercial digital presses, ink jet digital printers, toner based digital printers and multifunction printers.

14. The method of claim 7, wherein said converted electronic digital security file resides in a client/server based printer driver or firmware of digital output equipment and printed on demand.

15. An article comprising a non-transitory storage medium having stored thereon instruction that when executed by a machine result in the following operations:
- converting an electronic source graphic file into a converted electronic digital security file including a multi-tonal background screen image area including a first set of various size halftone elements and a multi-tonal foreground hidden warning text and/or graphic screen image area including a second set of various size halftone elements, wherein said first set of various size halftone elements are smaller in size than said second set of various size halftone elements; and
- printing the converted electronic digital security file creating a printed document with said multi-tonal background and said multi-tonal foreground, wherein when said printed document is electronically copied creating a copy of said printed document, said foreground areas appear differently from the background area on said copy of said printed document, and wherein each tone of multiple tones produced by a single said background screen and a single said foreground screen are a shade created by one ink color.

* * * * *